United States Patent
Feder et al.

(10) Patent No.: US 8,160,538 B2
(45) Date of Patent: Apr. 17, 2012

(54) ACCESSING NETWORKS FOR LIMITED PURPOSES

(75) Inventors: Peretz Moshe Feder, Englewood, NJ (US); Ajay Rajkumar, Morristown, NJ (US)

(73) Assignee: Alcatel Lucent, Paris (FR)

( * ) Notice: Subject to any disclaimer, the term of this patent is extended or adjusted under 35 U.S.C. 154(b) by 582 days.

(21) Appl. No.: 12/321,019

(22) Filed: Jan. 15, 2009

(65) Prior Publication Data
US 2009/0197572 A1  Aug. 6, 2009

Related U.S. Application Data

(60) Provisional application No. 61/011,482, filed on Jan. 16, 2008.

(51) Int. Cl.
*H04M 11/04* (2006.01)
(52) U.S. Cl. .......... 455/404.1; 455/404.2; 455/435.3; 455/404.3; 370/389; 370/229; 370/351
(58) Field of Classification Search .......... 455/404.1, 455/404.2, 404.3, 404.4, 435.3, 411; 370/389, 370/229, 351
See application file for complete search history.

(56) References Cited

U.S. PATENT DOCUMENTS

| | | | | |
|---|---|---|---|---|
| 6,477,644 B1 * | 11/2002 | Turunen | ........................ | 713/161 |
| 2005/0221813 A1 | 10/2005 | Rajahalme et al. | ........ | 455/422.1 |
| 2006/0094397 A1 | 5/2006 | Raghuram et al. | ......... | 455/404.1 |
| 2009/0191841 A1 * | 7/2009 | Edge et al. | ................. | 455/404.1 |
| 2009/0270066 A1 * | 10/2009 | Noguchi et al. | ........... | 455/404.2 |
| 2009/0310758 A1 * | 12/2009 | Tuohino et al. | ................. | 379/37 |
| 2010/0014508 A1 * | 1/2010 | Yang | ............................. | 370/352 |

FOREIGN PATENT DOCUMENTS

| | | |
|---|---|---|
| EP | 1 257 141 A1 | 11/2002 |
| GB | 2 416 960 A | 2/2006 |
| GB | 2416960 A * | 2/2006 |

OTHER PUBLICATIONS

"Draft Standard for Local and Metropolitan Area Networks: Media Independent Handover Services", *IEEE P802.21/D14*, Sep. 2008, Title page, Table of Content, pp. 47-59.
PCT International Search Report dated May 12, 2009 (PCT/US2009/000262) 4 pages.

* cited by examiner

*Primary Examiner* — Ajit Patel
*Assistant Examiner* — Khai M Nguyen
(74) *Attorney, Agent, or Firm* — J. F. McCabe

(57) ABSTRACT

One method includes setting up an authenticated communication session between a mobile terminal and a first core data network. The method includes acquiring, at the first core data network, supplementary access data usable by the mobile terminal to set up a non-authenticated communication session with a second data network and then, transmitting the supplementary access data from the first core data network to the mobile terminal. The second data network is accessible to the mobile terminal.

20 Claims, 5 Drawing Sheets

ACCESSING NETWORKS FOR LIMITED PURPOSES

This application claims the benefit of U.S. provisional patent application No. 61/011,482, which was filed on Jan. 16, 2008.

BACKGROUND

1. Field of the Invention

The inventions relate generally to apparatus and methods for communicating with data networks.

2. Discussion of the Related Art

This section introduces aspects that may help facilitate a better understanding of the inventions. Accordingly, the statements of this section are to be read in this light and are not to be understood as admissions about what is prior art or what is not prior art.

In many ordinary situations, a user mobile may be located in access regions for a plurality of data networks. For example, the user may be simultaneously in the access regions of two different types of data networks, e.g., a CDMA cellular telephone network and a wireless WIFI data network. Typically, accessing a data network involves performing an initial setup process in which data is transmitted between the user's mobile terminal and the data network-to-be-accessed. The transmitted data may include, e.g., authentication, authorization, and accounting (AAA) data, and/or other data. Often, some such data is processed, as received, and stored by an AAA server of the data network to-be-accessed.

Even though a user may be simultaneously located in the access areas of multiple data networks, the user may be only able to access one of the data networks with his/her mobile terminal. For example, the user's mobile terminal may be configured to communicate with only one of the data networks, e.g., because his/her mobile terminal is configured as a GSM cellular terminal and thus, cannot communicate with a local CDMA cellular network. The multiple data networks may be wireless and/or wired data networks. Indeed, a user may find that he or she is simultaneously located in access regions of a set of data networks that communicate with users according to the GSM, CDMA, GPRS, WiFi, Bluetooth, and/or another IEEE WLAN 802.11 standard.

SUMMARY

Various embodiments provide methods and apparatus for enabling a user with a mobile terminal for communicating with a first core data network to rapidly access a second data network with the mobile terminal in a non-authenticated manner. For example, the access to the second data network may be available for the limited purposes of making emergency calls and/or for using a local area finding services.

One embodiment features a first method that includes setting up an authenticated communication session between a mobile terminal and a first core data network. The method includes acquiring, at the first core data network, supplementary access data usable by the mobile terminal to set up a non-authenticated communication session with a second data network and then, transmitting the supplementary access data from the first core data network to the mobile terminal. The second data network is accessible to the mobile terminal.

In various embodiments of the first method, the second data network is an access network or a core data network.

In some embodiments of the first method, the supplementary access data identifies one or more of a data transmission timing, a data frame structure, a security key, and a data transmission protocol for the second data network.

In some embodiments of the first method, the supplementary access data includes parameters for accessing the second data network. The parameters are broadcast by the first or second data networks or an access network thereof in a region of the mobile terminal.

Another embodiment features a second method that includes receiving at a mobile terminal supplementary access data from a first core data network. The supplementary access data enables a setup of a non-authenticated communication session with a second data network. The method includes setting up a non-authenticated communication session between the mobile terminal and the second data network by using said received supplementary access data.

In various embodiments of the second method, the second data network is an access network or a core data network.

In some embodiments of the second method, the setting up is performed without passing data from the mobile terminal to the second data network via the first core data network after the receiving step.

In some embodiments of the second method, the non-authenticated communication session includes an emergency call.

In some embodiments of the second method, the setting up step produces a communication session via a second wireless base station or wired access node of the second data network, and the supplementary access data is received from a different first wireless base station or access node of the first core data network.

In some embodiments of the second method, the supplementary access data includes information identifying one or more of a data transmission timing, a data frame structure, a security key, and a data transmission protocol for the second data network.

In some embodiments of the second method, the supplementary access data includes parameters for accessing the second data network. The parameters are broadcast by the first or second data networks or an access network thereof in a region of the mobile terminal.

In some embodiments of the first and second methods, the supplementary access data includes information for setting up an emergency services call or a locator services communication session for a physical area of the mobile terminal via the second data network. The information may include one or more of an identity of a P-CSCF, an identity of an E-CSCF, an identity of a PSAP, an identity of an emergency services routing proxy, and an emergency service routing number.

Another embodiment features a first apparatus that includes a portion of a first core data network. The portion of the first core data network has an information database server and an authentication server. The portion of the first core data network is also configured to set up authenticated communication sessions with a mobile terminal, to acquire supplementary access data usable to set up a non-authenticated communication session with a second data network, and to transmit the supplementary access data to the mobile terminal for use thereby.

In various embodiments of the first apparatus, the second data network is a core data network or an access network.

In some embodiments of the first apparatus, the supplementary access data includes parameters for accessing the second data network. The parameters are broadcast by the first or second data networks or an access network thereof in a region of the mobile terminal.

In some embodiments of the first apparatus, the supplementary access data includes information identifying one or more of a data transmission timing, a data frame structure, a security key, and a data transmission protocol for the second data network.

Another embodiment features a second apparatus that includes a mobile terminal that is configured to set up an authenticated communication session with a first core data network and to receive supplementary access data during said session. The mobile terminal is configured to use said supplementary access data to set up a non-authenticated communication session with a second data network.

In various embodiments of the second apparatus, the second data network is a core data network or an access network.

In some embodiments of the second apparatus, the supplementary access data includes access parameters for the second data network. The access parameters are broadcast from an access node of the first or second data networks.

In some embodiments of the first and second apparatus, the supplementary access data includes information for setting up an emergency services call or a locator services communication session for a physical area of the mobile terminal via the second data network.

In some embodiments of the second apparatus, the supplementary access data includes information identifying one or more of a data transmission timing, a data frame structure, a security key, and a data transmission protocol for the second data network.

In some embodiments of the second apparatus, the mobile terminal is configured to use the supplementary access data to access the second data network via a different communication protocol than the communication protocol used in the authenticated communication session with a first core data network

In some of the Figures, relative dimensions of some features may be exaggerated to more clearly illustrate the structures shown therein.

While the Figures and the Detailed Description of Illustrative Embodiments describe some embodiments, the inventions may have other forms and are not limited to those described in the Figures and the Detailed Description of Illustrative Embodiments.

DETAILED DESCRIPTION OF ILLUSTRATIVE EMBODIMENTS

U.S. provisional patent application No. 61/011,482, which was filed on Jan. 16, 2008 by P. Feder and A. Rajkumar, is incorporated herein by reference in its entirety.

While a data network typically requires authentication of a user prior to authorizing the set up a communication session with the user's terminal, various embodiments of data networks herein enable setting up some types of non-authenticated communication sessions between the data network and a user's terminal.

Herein, a non-authenticated communication session refers to a communication session that is set up between the data network and a user's terminal either (A) without the data network authenticating and authorizing the credentials of the user's terminal or (B) after the data network has refused to authorize the user's terminal. Examples of credentials of a user's terminal may include authentication key(s), SIM (Subscriber Identity Module) and/or USIM (Universal SIM) card credentials and/or password(s). In above-listed case A, the authentication may be absent, because the user's terminal did not present credentials to the data network when it requested the set up of a communication session there with or because the user's terminal presented user credentials that were not validated in order to allow expedited network access.

Herein, a step of authorizing may further include verifying: a user's billing or account status, a user's access priority level, and/or a user's specific service authorizations. In various embodiments, such an authorization step may or may not be performed prior to the start of a non-authenticated data or voice communication session.

Figure 1:
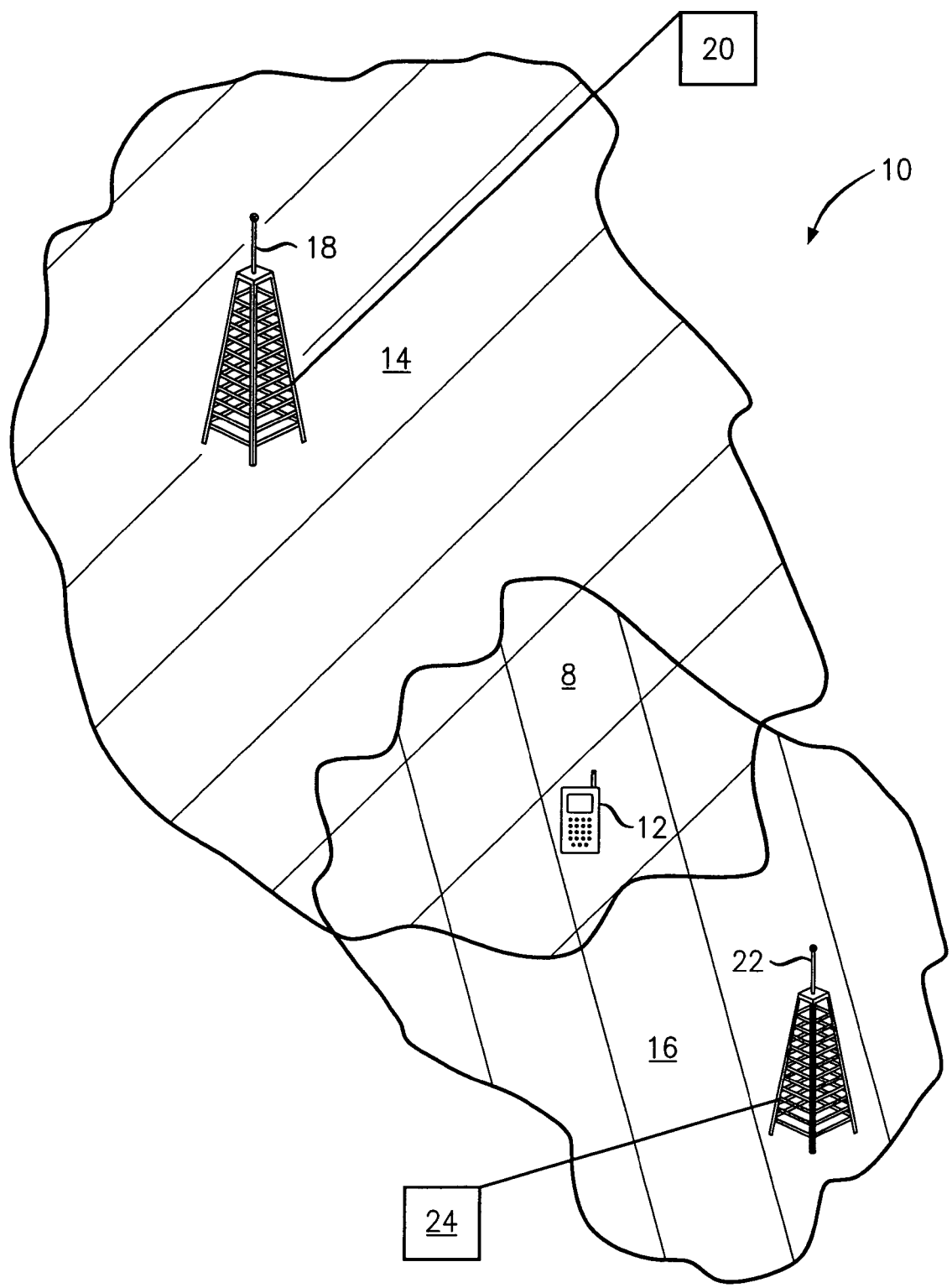
FIG. 1 illustrates an exemplary multiple network environment in which some embodiments of the apparatus and methods described herein operate.

FIG. 1 schematically illustrates an exemplary physical environment 10 for some embodiments of apparatus and methods described herein. In the physical environment 10, a user's mobile terminal 12, e.g., a personal computer (PC), a portable data access (PDA) device, or a cellular handset, connects to a first core data network via a first local access region 14 and is located in a second local access region 16 of a second data network. The second data network may be either a core data network or an access network. For example, the user's mobile terminal 12 may be in a overlap region 8 for which both the first and second data networks are accessible. The overlap region 8 may be, e.g., a physical overlap of the local access regions 14, 16 for both data networks. Alternately, the overlap region 8 may be an environment in which the user's mobile terminal 12 is wire connected to the first core data network, e.g., the first access region 14 uses a DSL or cable access, and is physically located in a wireless access area of the access region 16 for the second data network.

Herein, a data network is a network that communicates with a user's mobile terminal via the digital data transmission and reception of data, e.g., for data and/or voice communications.

Herein, an access network is a data network that connects subscribers or users to another data network, e.g., a core data network.

Herein, a core data network is a central part of a data network that is configured to provide services to users and/or subscribers. The core data network may, e.g., be owned by a telecom that provides the various services. A connection to the core data network may be made via an access node and/or an access network.

With respect to the first core data network, the user's mobile terminal 12 has performed the exchange of information to set up an authenticated data connection or data communication session therewith. The exchange may, e.g., include communicating one or more authentication keys, one or more passwords, and possibly user accounting data between the user's mobile terminal 12 and the first core data network, i.e., via an appropriate local wireless base station or wired access node 18 for the first core data network. Often, the set up involves the transmission of information between the user's mobile terminal 12 and the local wireless base station or wired access node 18 and the processing of transmitted information by a distant data server 20 of the first data network, e.g., a standard authentication, authorization, and accounting (AAA) data server.

The setup of the connection or communication session with the first core data network may involve the receipt of setup and/or the transmission information prior to initiation of the setup by the user's mobile terminal 12. For example, the wireless base station or wired access node 18 may broadcast relevant setup or access information to the first access region 14 at regular intervals, e.g., on a wireless pilot beam.

To establish an ordinary connection or communication session with the second data network, i.e., a core or access data network, the user's mobile terminal 12 would typically perform a second setup process via an appropriate local wireless base station or a wired access node 22 for the second data network. Such a second setup process typically would involve exchanging authentication, authorization, and/or user accounting data, e.g., an exchange of authentication key(s) and/or password(s). During the second setup process, the local wireless base station or wired access node 22 of the second data network may interact with a distant data server 24 thereof to authenticate and authorize the user's mobile terminal 12, e.g., a AAA data server of the second data network. Prior to performing the second setup process, the user's mobile terminal 12 may need setup and/or transmission information that is broadcast by the wireless base station or wired access node 22 for the second data network. For example, such information may be transmitted at regular intervals, e.g., by a pilot beam. Setting up a connection or communication session with the second data network may also involve using a protocol different from protocols used for a communication session with the first core data network.

In various situations, the user's mobile terminal 12 may be able to set up an ordinary communication session with the first core data network, but it may be undesirable or impossible to set up an ordinary communication session between the user's mobile terminal 12 and the second data network. For example, the ordinary setup process for an authenticated communication session between the user's mobile terminal 12 and the second data network may be too time consuming, e.g., requiring more than 5, 10, 20, or 30 seconds. Alternately, the user and/or user's mobile terminal 12 may be unable to set up an ordinary authenticated communication session with the second data network, e.g., because the user or user's mobile terminal does not have an access account or valid authorization for the second data network.

Nevertheless, the user may still want to quickly connect to the second data network to establish a communication session of limited scope. For example, the user may want to establish a limited communication session with the second data network to handle an unforeseen or emergency event or to obtain a local service that is available from the second data network and is unavailable from the first core data network. Examples of such unforeseen events may include a temporary unavailability of the wireless base station or wired access node 18 of the first core data network and emergency situations in which the user wants to make an emergency call. Examples of such local services include geographical local finder services for the local area of the user. The geographical local finder services may include services for finding restaurants or business establishments in the local area of the user, e.g., services that may be financed by advertising fees from the local service furnishers. Such emergency services and local services may be useful when the user's mobile terminal is roaming in an access region 16 for the second data network or when the first core data network does not offer such services for the location of the user.

To enable such a limited access to the user's mobile terminal 12, the first core data network of FIG. 1 may be configured to automatically perform the steps of a method 30. As a result of performance of the method 30, the user's mobile terminal 12 can cause the set up of a limited connection or communication session with the second data network, i.e., as an unauthenticated user. The set up of such a limited connection or communication session does not include performing all steps for setting up an ordinary authenticated connection or communication session with the second data network or any access network therefor. For that reason, some embodiments may be able to cause the set up of such limited connections or communication sessions more rapidly than the time for setting up an authenticated connection or communication session between a mobile terminal and the second core data network.

Figure 2:
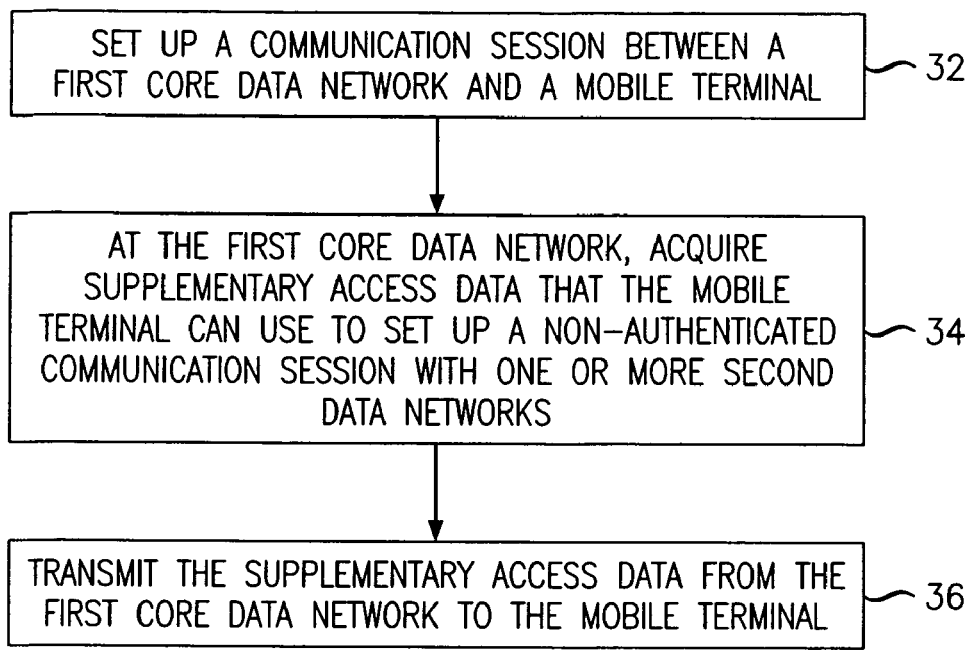
FIG. 2 is a flow chart illustrating a method for providing supplementary access data to a mobile terminal from a first core data network to enable a user of the mobile terminal to access a second data network.

Referring to FIG. 2, the method 30 includes setting up a communication session between a user's mobile terminal, e.g., a PC, a PDA device, a cellular handset or another user mobile terminal 12 as shown in FIG. 1, and a first core data network (step 32). The communication session may be, e.g., an authenticated data communication session. The setting up step 32 establishes and ordinary communication session between the user's mobile terminal and the first core data network. The first core data network may be, e.g., the home core data network of the user, and the user's mobile terminal may be in an access region for the home core data network or may be roaming in an access region for another data network.

The method 30 includes acquiring in or receiving at the first core data network supplementary access data that the user's mobile terminal can use to set up a non-authenticated communication session with one or more second data networks, e.g., communication sessions for limited purposes (step 34). Each second data network has an access node or access network that is physically accessible to the user's mobile terminal. Each second data network is a core data network or an access network. The first core data network may use user data to identify an appropriate set of second data networks, e.g., second data networks locally accessible to the user's mobile terminal or second data networks offering additional local services that the specific user may desire. The user data may include received information about the physical location of the user's mobile terminal and/or stored information about the form of the user's mobile terminal, e.g., whether the user's mobile terminal is enabled for CDMA, GPS, or WIFI type communications. The supplementary access data may identify transmission frequencies or carriers, limited access keys, accepted protocols, security keys, data transmission timing information, and/or data frame structures for communication sessions with the second data networks and any access networks thereto that are available to the user's mobile terminal.

A portion of the supplementary access data may be already directly available to the user's mobile terminal. For example, said portion of the supplementary access data may be broadcast by access equipment for the second core data networks, e.g., via pilot beams retransmitted periodically. But, the receipt of such data as supplementary access data obviates the need for the user's mobile terminal to wait for a rebroadcast of such data prior to initiating a communication session with on or more of the second data networks.

The method 30 includes transmitting the supplementary access data for accessing the one or more second data networks from the first core data network to the user's mobile terminal (step 36). The transmission of the access data to the user's mobile terminal may be done automatically by the first core data network, e.g., during establishment of the communication session therewith and at regular intervals, and/or may be done in response to a later request for the supplementary access data by the user's mobile terminal.

The supplementary access data enables the user to make a non-authenticated and limited access to the one or more of the second data networks with his mobile terminal.

For example, the transmitted supplementary access data may enable the user to either more quickly setup a limited communication session with one of the second data networks or to setup such a communication session with one of the second data networks to which the user would not otherwise, be authorized to access. In some embodiments, the data communications session with the second data network(s) may be setup by the user's mobile terminal without interacting with AAA data servers in any of those networks.

In some embodiments of the method 30, the transmitted data enables the user's mobile terminal to access, at least, one of the second data networks prior to receiving access parameters broadcast via an access node near the physical location of the user's mobile terminal.

In some embodiments of the method 30, the supplementary access data enables the user to access one or more of the second data networks to obtain emergency services for the actual location of the user's mobile terminal. In some such embodiments, the supplementary access data may include information such as an identity of a proxy-Call Session Control Function (P-CSCF), an identity of an emergency services-CSCF (E-CSCF), an identity of a Public Safety Answering Point (PSAP), an emergency services routing proxy and/or an emergency service routing number that the user's mobile terminal can use to locally access one or more of the second data networks to obtain emergency services therefrom. Inclusion of such information in the supplementary access data can eliminate a need for an IP Multimedia Subsystem (IMS) or Session Initiation Protocol (SIP) system or the mobile terminal itself to make queries for: a P-CSCF, an E-CSCF, a PSAP, an Emergency Services Routing Proxy and/or an Emergency Service Routing Number when setting up an emergency call session for the user's mobile terminal in the second data network.

Figure 3:
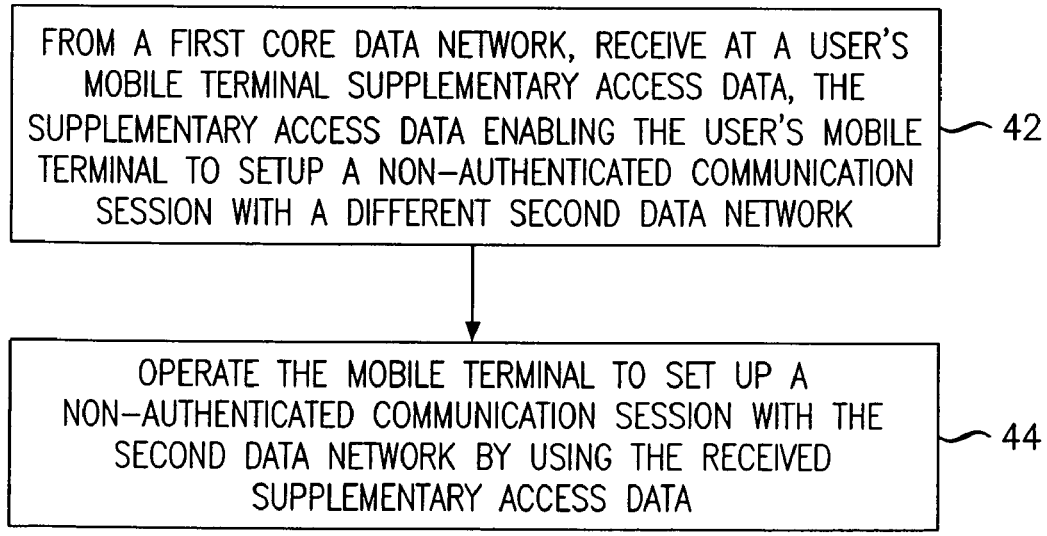
FIG. 3 is a flow chart illustrating a method for the mobile terminal of a user to make a non-authenticated access to a data network by using supplemental access data, e.g., received from another data network operating according to the method of FIG. 2.

FIG. 3 illustrates a method 40 in which a user sets up a non-authenticated communication session between his or her mobile terminal and a second data network, i.e., a core data network or an access network. The mobile terminal may be, e.g., a PC, a PDA device, a cellular handset or another user mobile terminal 12 as shown in FIG. 1.

The method 40 includes receiving at the user's mobile terminal supplementary access data from a first core data network, e.g., via the method 40 of FIG. 2 (step 42). During the receiving step, the user's mobile terminal is in a communication session with the first core data network, e.g., an authenticated data communication session. The supplementary access data enables the user's mobile terminal to setup a non-authenticated communication session with a different second data network, i.e., a core data network or an access network.

The supplementary access data may include, e.g., information about data transmission timing, data frame structure, and/or identification of a data transmission protocol for the second data network.

The supplementary access data may enable the user's mobile terminal to access the second data network without receiving access parameters periodically broadcast by wireless or wired access nodes or networks the second data network, i.e., even though such broadcasts are made periodically. Since the set up may not need to wait for the broadcast of such access parameters, a quicker set up of the communication session between user's mobile terminal and the second data network may be possible.

The method 40 also includes having the user operate his or her mobile terminal to set up a non-authenticated communication session with the second data network by using the received supplementary access data (step 44). The user's mobile terminal sets up the non-authenticated communication session with the second data network via an access node or access network located in a physical access region of the mobile terminal.

The user may perform the set up step 44 in response to an unforeseen event. For example, the non-authenticated communication session may be a voice communication with an emergency services center, e.g., a 911 service center or PSAP, or may be a data communication session that provides the user with another limited service of the second data network, e.g., a service that responds to or compensates for a sudden unavailability of access to the first core data network.

In some embodiments of the method 40, the supplementary access data includes information for setting up an emergency services call in the physical area of the user's mobile terminal. Such information may identity a P-CSCF, identify an E-CSCF, identify a PSAP, provide an emergency services routing proxy and/or provide an emergency service routing number that the user's mobile terminal can use to set up such an emergency services call with the second data network, e.g., via an IMS or SIP system.

Various methods described herein, e.g., the methods 30 and 40, may be performed by conventional digital computers or processors programmed with executable programs of instructions to perform steps of said methods. The instructions of such programs may be encoded in machine-executable form on digital data storage media, e.g., magnetic or optical disks, RAM memories, magnetic hard disks, flash memories, and/or ROM memories, to enable digital data processors to perform one, multiple or all of the steps of one or more of the above-described methods 30, 40 of FIGS. 2-3.

Figure 1A:
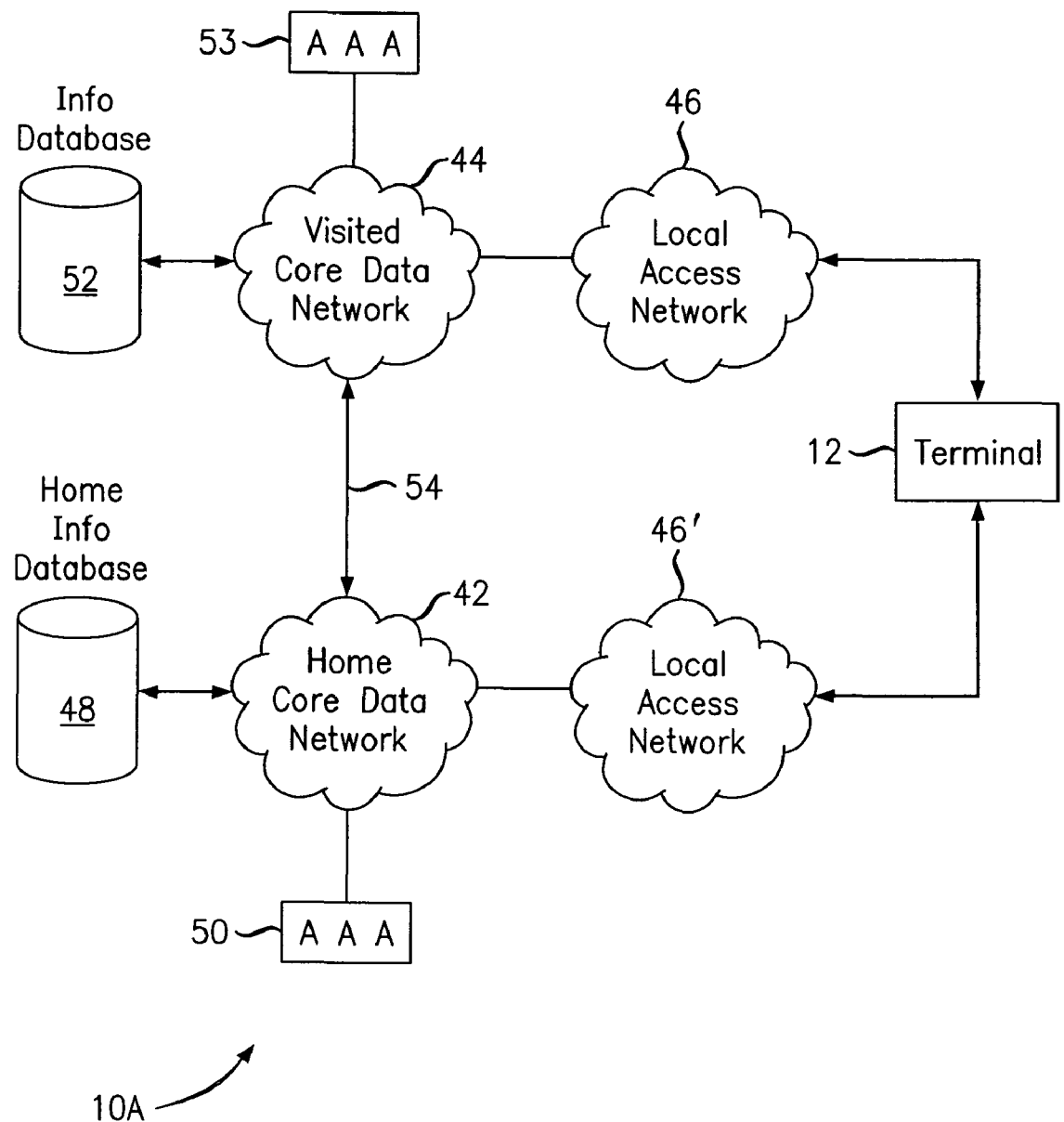
FIGS. 1A, 1B, and 1C illustrate various environments in which a user may use a mobile terminal to set up a non-authenticated communication session with one data network based on supplementary access data furnished by another data network.
Figure 1B:
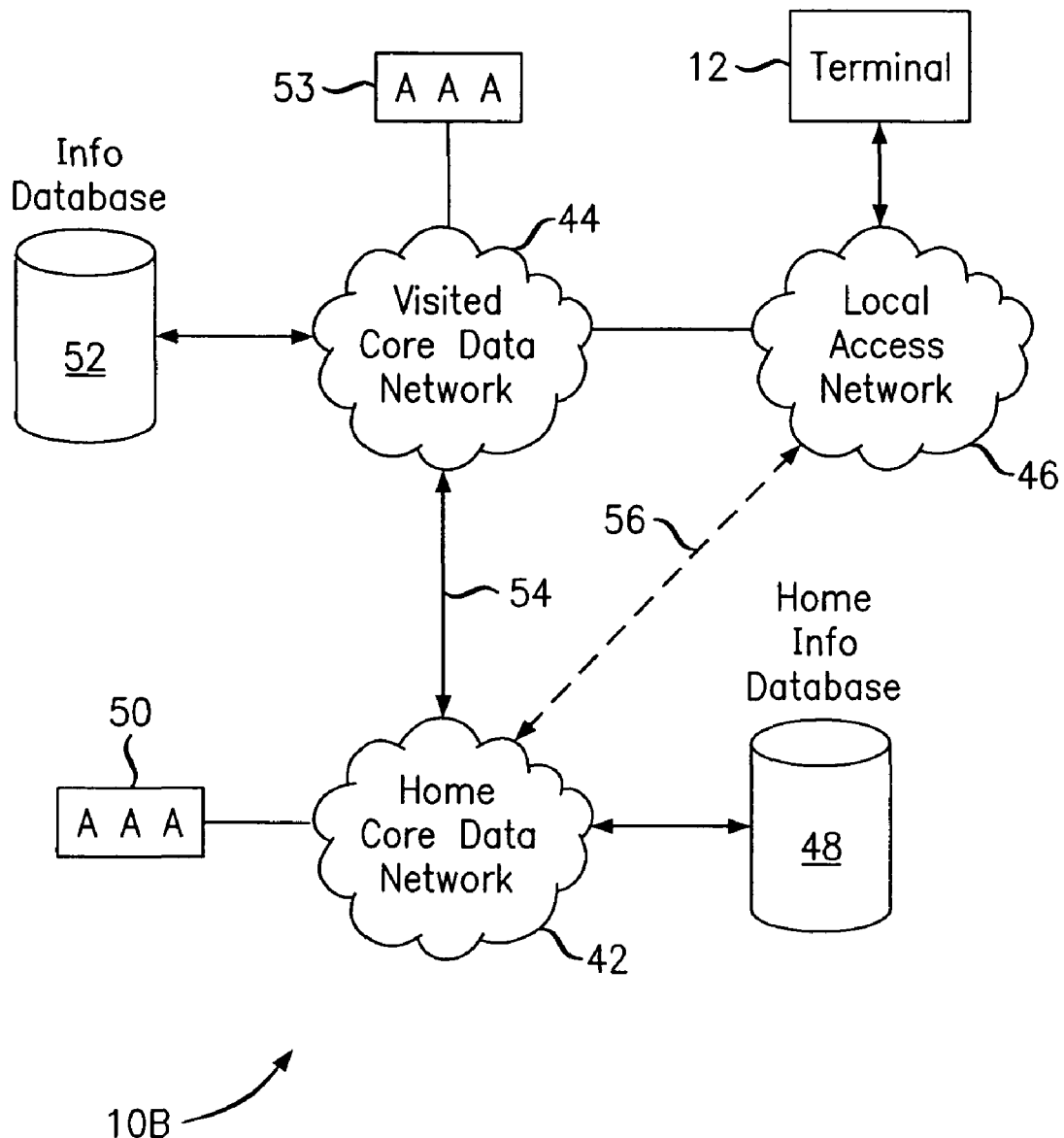
Figure 1C:
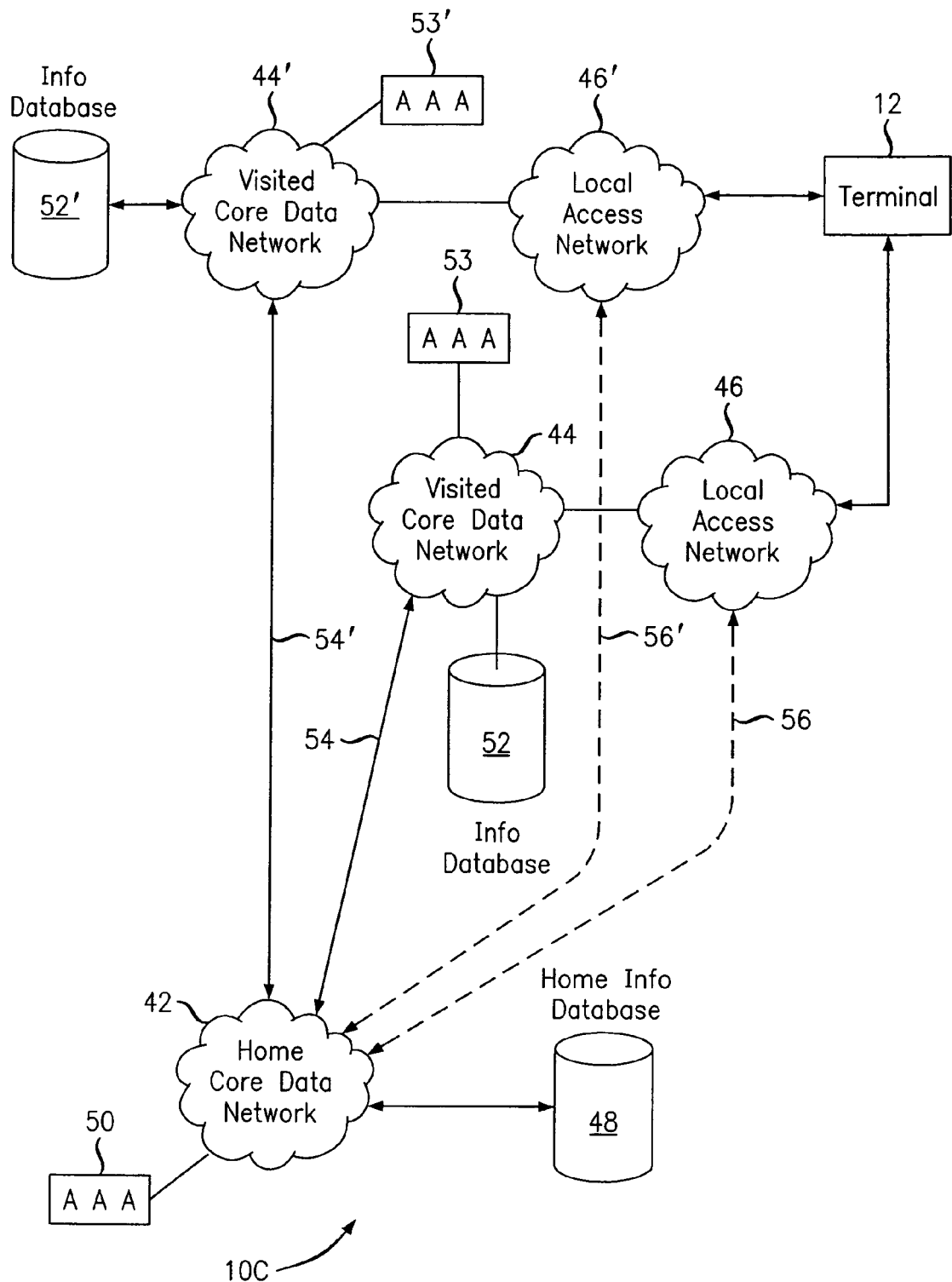

FIGS. 1A, 1B, and 1C illustrate various connectivity arrangements 10A, 10B, 10C between a user's mobile terminal 12, a home core data network 42, and one or more visited core data networks 44, 44'. In the connectivity arrangements 10A, 10B, the user's mobile terminal 12 can access one or more visited core data networks 44, 44' and its home core data network 42 via one or more associated access networks 46, 46'. The home core data network 42 has its own information database server(s) 48 and an authentication, authorization, and accounting (AAA) data server 50. The one or more visited core data networks 44, 44' have their own information database server(s) 52, 52' and AAA data server(s) 53, 53'. The home core data network 42 connects to the visited core data networks 44, 44' by one or more data communications links 54, 54'.

In the connectivity arrangement 10A of FIG. 1A, the user's mobile terminal 12 accesses the visited and home core data networks via different access networks 46, 46'. The two access networks 46, 46' may support the same types of access technologies or different types of access technologies, e.g., a wire line technology versus a wireless technology or a WIFI technology versus a GSM or a CDMA cellular technology. In the case of different access technologies, the user's mobile terminal 12 is a dual mode terminal, which supports the different access technologies.

In the connectivity arrangement 10B of FIG. 1B, the user's mobile terminal 12 accesses the visited and home core data networks 44, 42 via the same access network 46. Here, a data or voice communication session between the home core data network 42 and the user's mobile terminal 12 may be supported via the access network 46 and the visited data networks 44, e.g., as in the case of cell phone roaming. Alternately, such a communication session may be supported by the access network 46 and a direct communications link 56 to the home core data network 42.

In the connectivity arrangement 10C of FIG. 1C, the user's mobile terminal 12 may access the home core data network 42 and one or either of the visited core data networks 44, 44' via the associated access network 46, 46'. Here, a data or voice communication session between the home core data network 42 and the user's mobile terminal 12 may be supported via one or either of the said access networks 46, 46' and either of the visited data networks 44, 44', e.g., as in the case of cell phone roaming. Alternately, such a communication session may be supported by one or either of the access networks 46, 46' and associated direct communications link(s) 56, 56' to the home core data network 42.

In the connectivity arrangement 10C, the supplementary access data may enable the user's mobile terminal 12 to set up non-authenticated communication sessions with either of the visited core data networks 44, 44' and the associated one of the access networks 46, 46'. The user may select between accessing the two visited core data networks 44, 44' with his or her mobile terminal 12 based on different information services, quality of services, and/or costs of services offered by the two different visited core data networks 44, 44'. For example, one of the visited core data networks 44 may provide emergency services, and the other of the visited core data networks 44' may provide locator services so that the user must choose a different one of the visited core data networks 44, 44' for the different services.

In the connectivity arrangements 10A, 10B, 10C the user's mobile terminal 12 can set up authenticated data communication sessions with its home core data network 42 and non-authenticated data or voice communication sessions with the one or more visited core data networks 44, 44', e.g., by performing the method 40 of FIG. 3.

In the connectivity arrangements 10A, 10B, 10C, the home core data network 42 performs, e.g., the method 30 of FIG. 2 to provide supplementary access data to the user's mobile terminal 12. The supplementary access data enables the user's mobile terminal 12 to set up non-authenticated data or voice communication sessions with the one or more visited data networks 44, 44'.

In the arrangement 10A, the user's mobile terminal 12 may be able to connect to two different types of access networks 46, 46', e.g., even simultaneously. Such a multi-access-mode embodiment of the user's mobile terminal 12 may request or automatically receive supplemental access data from the home data network 42 for use in accessing the one of the visited data networks 44' and the associated access network 46' based on one access technology and for use in accessing the other of the visited data networks 44 and the associated access network 46 based on a different access technology.

In the arrangements 10A, 10B, 10C of FIGS. 1A-1C, the user's mobile device 12 can obtain data from one or more of the information database servers of the one or more visited core data networks 44, 44' via the non-authenticated communication session therewith. The user's mode terminal 12 may access, e.g., Event Services, Command Service (CS) and Information Services (IS) in both visited core data networks 44, 44'.

In some embodiments, the supplementary access data provides the user's mobile terminal 12 with crucial parameters for accessing the one or more visited core data networks 44, 44'. Thus, access to the to the one or more visited core data networks 44 may be performed in an expedited manner, e.g., without waiting for an associated access network 46, 46' to broadcast the key parameters for accessing the associated visited data network 44, 44'. In some wireless systems, such key access data is only broadcast at very long intervals, e.g., at about 10 second intervals in WiMAX. Instead of waiting for such a broadcast, the user's mobile terminal 12 may receive the values of said key parameters in the supplementary access data received from the home data network 42. For emergency calls, such an expedited access technique may be extremely valuable.

If one of the visited data networks 44, 44' uses an IMS or SIP-based system to set up communication sessions, a local associated access network 46, 46' would need to find a proper P-CSCF, an E-CSCF, a PSAP, and/or an Emergency Service Routing Number (ESRN) to set up a communication session with the user's mobile terminal's 12. During roaming, the user's mobile terminal 12 does not typically have access to such information from the one or more visited data networks 44, 44' and typically cannot generate a query in the one or more visited data networks 44, 44' to find the local PSAP. For that reason, the home data network 42 may provide supplementary access data with such information pertinent to and based on the geographical location of the user's mobile terminal 12.

To set up an emergency call in such a visited data network 44, 44', the user's mobile terminal uses or provides the relevant IMS or SIP-based system and emergency call-related information to the access network 46, 46' and/or the associated visited data network 44, 44' based on the received supplementary access data. Thus, the set up of an emergency call session in such a visited core data network 44, 44' may be performed without an IMS or SIP system or the mobile terminal itself performing discovery steps for the above-listed information. That is, the setup of such an emergency call session can be done without making queries for discovering: a P-CSCF, an E-CSCF, a PSAP, an Emergency Services Routing Proxy and/or an Emergency Service Routing Number.

In various embodiments of the arrangements 10, 10A-10C of FIGS. 1 and 1A-1C, setup of non-authenticated communication sessions with the second core data network(s) may be supported by a SIP or SIP-like protocol, and information needed for making a non-authenticated connection in the visited data network can be, e.g., represented in an Extensible Markup Language (XML) format or a type length value (TLV) format.

The invention is intended to include other embodiments that would be obvious to one of skill in the art in light of the description, figures, and claims.

What is claimed is:

1. A method, comprising:
    setting up an authenticated communication session between a mobile terminal and a first core data network;
    at the first core data network, acquiring supplementary access data usable by the mobile terminal to set up a non-authenticated communication session with a second data network accessible to the mobile terminal; and
    then, transmitting said supplementary access data from the first core data network to the mobile terminal; and
    wherein the supplementary access data includes information to set up a locator services communication session for the location of the mobile terminal, an identity of a P-CSCF, an identity of an E-CSCF, an identity of a PSAP, an emergency services routing proxy, or an emergency services routing number.

2. The method of claim 1, wherein the second data network is an access network or a core data network.

3. The method of claim 1, wherein the supplementary access data identifies one or more of a data transmission timing, a data frame structure, and a data transmission protocol for the second data network.

4. The method of claim 1, wherein the supplementary access data includes parameters for accessing the second data network, the parameters being broadcast by the second data network or an access network thereof in a region of the mobile terminal.

5. A method, comprising:
   from a first core data network, receiving supplementary access data at a mobile terminal, the supplementary access data enabling a setup of a non-authenticated communication session with a second data network; and
   setting up a non-authenticated communication session between the mobile terminal and the second data network by using said received supplementary access data; and
   wherein the supplementary access data includes information to set up a locator services communication session for the location of the mobile terminal. an identity of a P-CSCF, an identity of an E-CSCF, an identity of a PSAP, an emergency services routing Proxy, or an emergency services routing number.

6. The method of claim 5, wherein the second data network is a core data network or an access network.

7. The method of claim 5, wherein the setting up is performed without passing data from the mobile terminal to the second data network via the first core data network after the receiving step.

8. The method of claim 5, wherein the non-authenticated communication session includes an emergency call.

9. The method of claim 5, wherein the setting up step produces a communication session via a second wireless base station or wired access node of the second data network and the supplementary access data is received from a different first wireless base station or access node of the first core data network.

10. The method of claim 5, wherein the supplementary access data includes information identifying one or more of a data transmission timing, a data frame structure, a security key, and a data transmission protocol for the second data network.

11. The method of claim 5, wherein the supplementary access data includes parameters for accessing the second data network, the parameters being broadcast by the second data network or an access network thereof in a region of the mobile terminal.

12. An apparatus, comprising:
   a portion of a first core data network that includes an information database server and an authentication server;
   the portion being configured to set up authenticated communication sessions with a mobile terminal, to acquire supplementary access data usable to set up a non-authenticated communication session with a second data network, and to transmit the supplementary access data to the mobile terminal for use thereby; and
   wherein the supplementary access data includes information to set up a locator services communication session for the location of the mobile terminal, an identity of a P-CSCF, an identity of an E-CSCF, an identity of a PSAP, an emergency services routing proxy, or an emergency services routing number.

13. The apparatus of claim 12, wherein the second data network is a core data network or an access network.

14. The apparatus of claim 12, wherein the supplementary access data includes parameters for accessing the second data network, the parameters being broadcast by the second data network or an access network thereof in a region of the mobile terminal.

15. The apparatus of claim 12, wherein the supplementary access data identifies one or more of a data transmission timing, a data frame structure, and a data transmission protocol for the second data network.

16. An apparatus, comprising:
   a mobile terminal configured to set up an authenticated communication session with a first core data network and to receive supplementary access data during said session; and
   wherein the mobile terminal is configured to use said supplementary access data to set up a non-authenticated communication session with a second data network; and
   wherein the supplementary access data includes information for setting up a locator services communication session for the location of the mobile terminal, an identity of a P-CSCF, an identity of an E-CSCF, an identity of a PSAP, an emergency services routing proxy, or an emergency services routing number.

17. The apparatus of claim 16, wherein the second data network is a core data network or an access network.

18. The apparatus of claim 16, wherein the said supplementary access data includes access parameters for the second data network, the access parameters being broadcast from an access node of the second data network.

19. The apparatus of claim 16, wherein the supplementary access data includes information identifying one or more of a data transmission timing, a data frame structure, and a data transmission protocol for the second data network.

20. The apparatus of claim 16, wherein the mobile terminal is configured to use the supplementary access data to access the second data network via a different communication protocol than the communication protocol used in the authenticated communication session with the first core data network.

* * * * *